United States Patent [19]

Szabo

[11] Patent Number: 5,096,576
[45] Date of Patent: Mar. 17, 1992

[54] AQUARIUM WATER FILTER SYSTEM

[75] Inventor: James Szabo, 2459 Niagara St., Buffalo, N.Y. 14207

[73] Assignee: James Szabo, Buffalo, N.Y.

[21] Appl. No.: 633,127

[22] Filed: Dec. 24, 1990

[51] Int. Cl.⁵ .............................................. A01K 63/04
[52] U.S. Cl. ............................... 210/150; 210/169; 210/416.2; 119/5
[58] Field of Search ...................... 210/169, 416.2, 405, 210/456, 150, 151, 247, 248; 119/5

[56] References Cited

U.S. PATENT DOCUMENTS

| | | | |
|---|---|---|---|
| 3,774,766 | 11/1973 | Brock | 210/169 |
| 4,684,462 | 8/1987 | Augustynisk | 210/169 |
| 4,861,465 | 8/1989 | Augustyniak | 210/169 |
| 4,988,436 | 1/1991 | Cole | 210/169 |

Primary Examiner—Peter Hruskoci
Assistant Examiner—Robert James Popovics

[57] ABSTRACT

A water filtration system for both fresh and salt water aquariums. The filter system housing is situated above the aquarium and consequently the aquarium water level thereby allowing gravity and not an integral system pump to return water to the aquarium after undergoing the filtration process. The water flow return rate to the aquarium is always matched exactly to the rate at which water is pumped into the filter system housing by a separate pump which is not a part of this invention. As a direct result of this, complicated valving and synchronization of pumps is not required. Gravity moves the water after intake over a distribution plate assembly and drop it over the entire surface of the biological filter material without the need for moving parts which may fail or wear out during continuous operation. Both mechanical and biological filtration occurs before the water is returned by gravity to the aquarium.

1 Claim, 3 Drawing Sheets

AQUARIUM WATER FILTER SYSTEM

FIELD OF INVENTION

This invention relates to water filters, and more specifically to those used for fresh or salt water aquariums.

BACKGROUND—DISCUSSION OF PRIOR ART

Heretofore, prior art has consisted of aquarium filters which must be mounted and operated from beneath the aquarium, usually situated within a framed structure of some sort and usually consealed by cabinet doors. These types of aquarium filter systems tend to have numerous parts and accessories, and hence a great deal of time is required for set-up. Other problems I perceive with the prior art filters include: excessive evaporation and hence loss of aquarium tank water; it is very difficult to match the output of the pump which pumps water from the filter underneath the aquarium tank back up to the aquarium tank, with the syphon intake into the filter from the aquarium (if they are not synchronized filter starvation or filter overflow will occur); excessive valves are required and they must be perfectly set in order to achieve inflow to outflow synchronization; pumps are usually submerged in the filter tank making them difficult to clean or service; syphon water flow to the filter tank is sometimes lost due to evaporation of the aquarium water level. My invention precludes these difficulties and problems as will be revealed within this specification.

OBJECTS AND ADVANTAGES

Accordingly I claim the following objects and advantages of my invention: to provide an aquarium filter system which mounts above the aquarium water level; to provide an aquarium filter system which does not require a skimmer box, nor the many other parts the prior art requires such as valving; to provide an aquarium filter system which employs an external pump which can be easily cleaned and serviced and where the external pump provides inflow into the aquarium rather than outflow, thereby precluding the need and worry about valving to synchronize inflow to outflow; to provide an aquarium filter system where the return flow to the aquarium is always perfectly matched to the pump flow from aquarium by virtue of gravity; to provide an aquarium filter system where a wide variety of pumps may be used, ranging in outputs up to 300 gallons per hour; to provide an aquarium filter system where evaporation is not critical since gravity feeds the return water to the aquarium tank and no skimmer box is used; to provide and aquarium filter system where set up time has been established to be approximately 5 minutes; to provide an aquarium filter system which unlike the prior art has no internal reservoir to accommodate an internal pump, since the pump used with my invention is external; to provide an aquarium filter system with a far greater biological material to volume ratio than other prior art filter systems; to provide an aquarium filter system in which the biological filter material is never submerged in water as other prior art systems do; to provide an aquarium filter system where during non-use, no water is stored anywhere within the filter housing; to provide an aquarium filter system where water flow within it starts and stops instantaneously by virtue of its unique gravity feed system and water non-storage feature; to provide an aquarium filter system with no syphon loss which can drain the aquarium tank causing overflow of the filter housing and thereby damage to property and death to aquarium fish; to provide an aquarium filter system where many commercially available power head pumps and canister pumps may be used in conjunction with my invention as the inflow pump to the filter system and where they can also serve as a prefilters for the inflow water before it reaches the filter system.

DRAWINGS

Drawings are enclosed herein in triplicate. See FIGS. 1 through 7.

Figure 1:
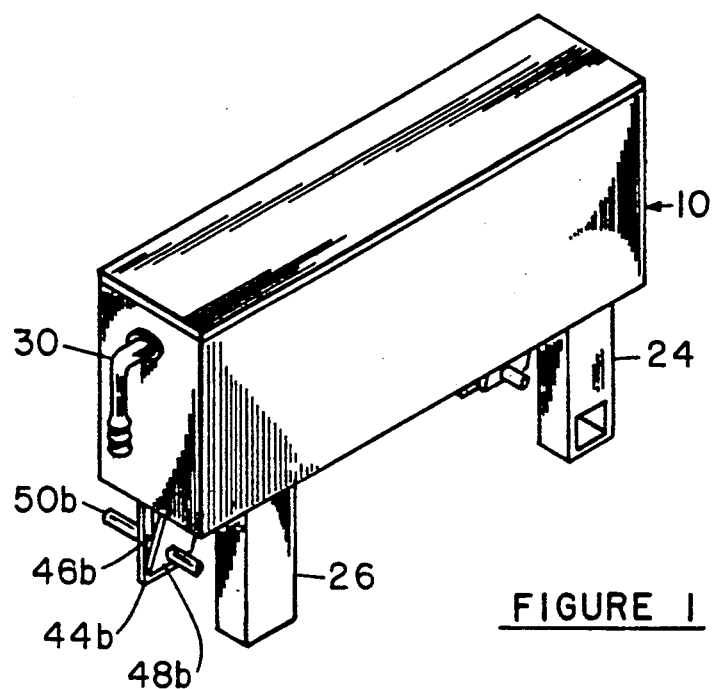
FIG. 1 is a pictorial view of the entire filter assembly.

LIST OF REFERENCE NUMERALS 10 housing assembly
12 (a and b) housing assembly ends
14 housing assembly bottom
16 (a and b) housing assembly sides
18 overflow plate
20 (a and b) distributor supports
22 (a through f) standoff supports
24 return conduit
26 clamp leg
28 housing outlet
30 piping inlet elbow
32 support plate
34 biological filter material
36 distribution plate assembly
38 splash plate assembly
40 cover assembly
42 (a through c) cover locators
44 (a and b) clamp standoff
46 (a and b) clamp spacer
48 (a and b) clamp wedge
50 (a and b) clamp pin

DESCRIPTION

Figure 2:
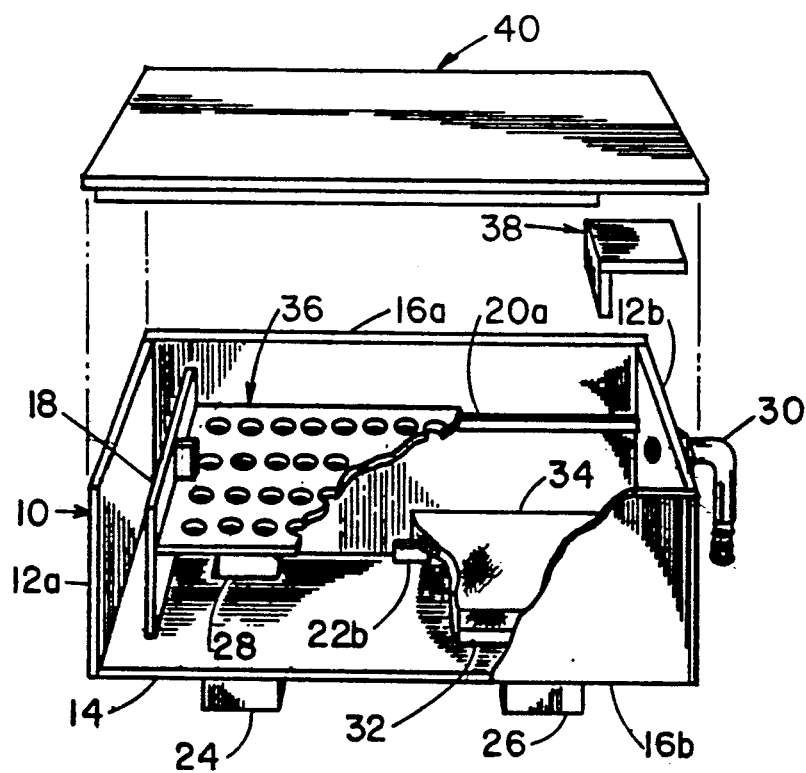
FIG. 2 is an exploded pictorial view with a partial sectional view of the entire filter assembly showing its interior components.
Figure 3:
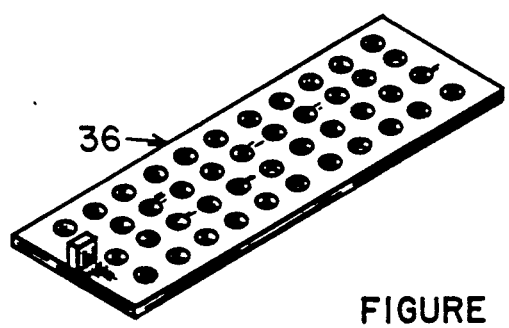
FIG. 3 is a pictorial view of the distribution plate assembly.
Figure 4:
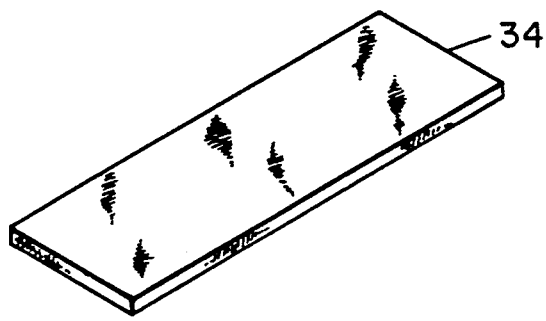
FIG. 4 is a pictorial view of the biological filter material.
Figure 5:
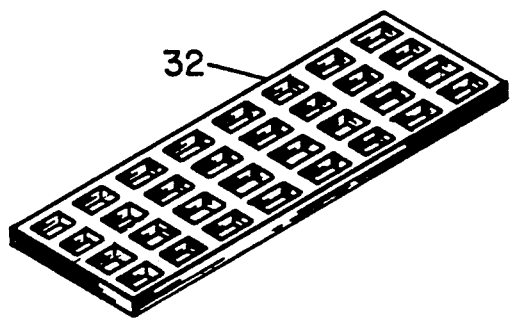
FIG. 5 is a pictorial view of support plate which holds up the biological filter material.
Figure 7:
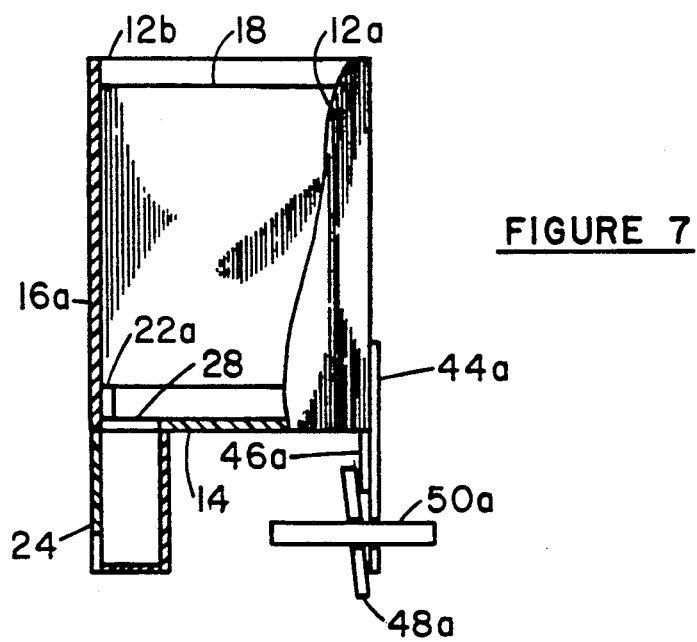
FIG. 7 is an end and partial sectional view showing the clamping mechanism and overflow plate end of housing assembly.

Referring to FIG. 2, there is shown a pictorial exploded and partial sectional view of my invention where housing assembly (10) consists of housing assembly ends (12a and b), housing assembly bottom (14), housing assembly sides (16a and b), overflow plate (18), distributor supports (20a shown and 20b not shown), and standoff supports (22b shown, but 22a and 22c through f not shown), a return conduit (24), clamp leg (26), clamp spacers (46a and b), and clamp standoffs (44a and b) best shown in FIGS. 1 and 7. These pieces are made of an acrylic plastic material which are cohesively bonded together with plastic cement (not shown) in the relationship shown in FIGS. 1, 2 and 7, and provide water tight joints at all junctures. Furthermore, overflow plate (18) is bonded to both housing assembly sides (16a and b) so that it is approximately ⅛ inch from both the housing assembly bottom (14) and top edges of cover assembly (40) during use. Return conduit (24) consists of acrylic pieces cohesively bonded to form a hollow chamber located under and all around housing outlet (28). The lower end of the return conduit also has an opening, best shown in FIG. 7. Clamp leg (26) is similarly constructed to the return conduit except that it has no openings above or below it. Standoff supports (22a through f, with only 22b shown in FIG. 1) are cohesively bonded to the housing sides and bottom in six locations equally and symetrically spaced along the distance between the overflow plate and the farthest housing assembly end.

Figure 6:
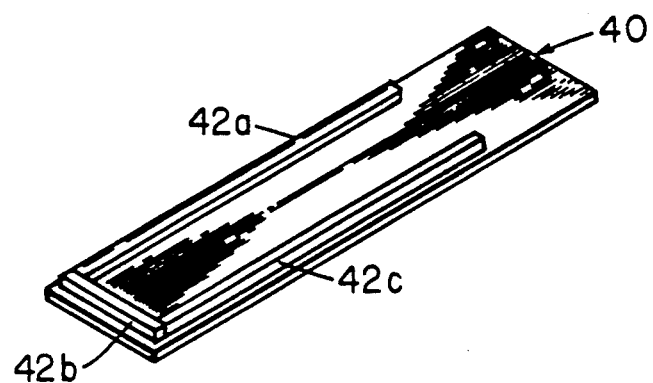
FIG. 6 is a pictorial view of the under-side of the cover assembly.

A purchased plastic piping inlet elbow (30) extends through a hole in the filter housing end (12b) as shown in FIG. 2, and is secured in place by means of a locknut supplied with the elbow. Support plate (32) rests freely on standoff supports (22a through f). Biological filter material (34) rests freely on support plate (32). Distribution plate assembly (36) rests freely on distributor supports (20a and b). Splash plate assembly (38) fits snugly between filter housing sides and against the filter housing assembly end which contains the inlet elbow as shown in FIG. 2. It is held in this position by friction between itself and both filter housing sides (16a and b). Cover Assembly (40) rests freely on the top surfaces of filter housing assembly sides and ends, and is located by means of cover locators (42a through c), best shown in FIGS. 2 and 6. When assembled, clamp pins (50a and b) are slid through holes in clamp standoffs (44a and b) and clamp wedges (48a and b). This is best shown in FIG. 7.

OPERATION

The entire assembly as described above herein is mounted onto an aquarium by placing the housing assembly bottom (14) on the top edge of the back wall of the aquarium so that the return conduit (24) and clamp leg (26) are in the aquarium water. Clamp pins (50a and b) are pushed in toward the back wall of the aquarium so that the clamp pins and the return conduit and clamp leg are in tight contact with the back wall, both in the water and out of it. At this point the clamp wedges (48a and b) are pulled with the fingers of the user's hands back toward the clamp standoffs (44a and b) thereby tightly wedging the clamp pins in place and thus securing the assembly in place. With the components of this invention located in place as described previously and as best shown in FIGS. 1 and 7, a plastic hose (not shown and not a part of this invention) is slid over piping inlet elbow (30) making a secure and water tight juncture. The other end of this hose is connected to the discharge port of a seperate and external aquarium water pump which is capable of drawing water out of the aquarium and pumping it up to and through the piping inlet elbow. Water which is pumped through the piping inlet elbow will flow across the top surface of the distribution plate assembly (36) and be distributed sufficiently so that water will flow through all of the holes in it. If water from the pump is sent across the distribution plate assembly with too great a velocity, then the water will at least partially hit the splash plate assembly (38) which will slow the water down sufficiently to allow a more even distribution across the distribution plate assembly so that water will flow through all of its holes. If holes are obstructed then water will accumulate, rise and then fall over the top of overflow plate (18) and drop into the bottom of the filter housing assembly. Otherwise, as water flows through the distribution plate assembly holes by means of gravity it will fall onto the biological filter material (34) beneath it, pass through it and drip through the many openings in the support plate (32) and into the bottom of the housing assembly (10). From beneath the support plate the water will return to the aquarium tank from which it came through housing outlet (28), then through and out the bottom opening of the return conduit (24) best shown in FIG. 7.

During normal operation, cover assembly (40) will be placed on top of the housing assembly (10) so that cover locators (42a through c) align themselves against the inside of housing assembly sides (16a and b) and housing assembly end (12a). Filtration and conditioning of the water occurs by means of it passing through the biological filter material. The water is mechanically filtered by means of the closely interwoven plastic fibers which make up the biological filter material, and it is also biologically filtered by means of bacteria growing within and throughout the biological filter material which consumes harmful waste by-products excreted from the fish in the aquarium and from decaying uneaten fish food.

I claim:
1. An aquarium water filtration system comprising:
   a) a topless rectangular box shaped filtration housing assembly, made of a plastic material,
   b) an inlet elbow having means to mount through a hole of sufficient size in one end of said filtration housing assembly and to allow pumped water to enter said filtration housing assembly and direct the flow of said water,
   c) a distribution plate assembly having a means comprising holes and a top surface to evenly distribute and control the incoming flow of said water over the interior of said filtration housing assembly,
   d) distributor supports having a means of being permanently bonded to the sides of said filtration housing assembly in such positions to support said distribution plate assembly just below the opening in said filtration housing assembly for said inlet elbow,
   e) a biological filter material sheet,
   f) a support plate having a means to position and support said biological filter material sheet horizontally and parallel to the bottom of said filtration housing assembly,
   g) standoff supports having a means of being permanently bonded to the sides and bottom of said filtration housing assembly so that said support plate is positioned and supported horizontally and parallel to the bottom of said filtration housing assembly,
   h) a means for said water to exit the bottom of said filtration housing assembly and to direct the return of said water by means of gravity alone to an aquarium tank from which it originally came,
   i) a cover assembly having a means for preventing the loss of said water by process of evaporation and with means to prevent dust and other airborne particles or contaminants from settling within said filtration housing assembly,
   j) a clamping means for positioning and securing said filtration housing assembly to the extreme top wall edge of said aquarium tank, k) a splash plate assembly having a means of reducing the velocity of said water entering said filtration housing assembly through said inlet elbow and thereby providing an even flow of said water over the top surface of said distribution plate assembly, l) an overflow plate means for directing excessive water accumulation to the bottom of said filtration housing assembly in the event the holes in said distribution plate assembly become obstructed.

* * * * *